(12) United States Patent
Jemt

(10) Patent No.: US 8,403,373 B2
(45) Date of Patent: Mar. 26, 2013

(54) METHOD AND DEVICE FOR DE-ICING OF TRAINS

(75) Inventor: Thomas Jemt, Vallingby (SE)

(73) Assignee: Nordic Ground Support Equipment IP AB, Solna (SE)

( * ) Notice: Subject to any disclaimer, the term of this patent is extended or adjusted under 35 U.S.C. 154(b) by 526 days.

(21) Appl. No.: 12/383,974

(22) Filed: Mar. 31, 2009

(65) Prior Publication Data

US 2009/0188989 A1    Jul. 30, 2009

Related U.S. Application Data

(63) Continuation-in-part of application No. 11/346,984, filed on Feb. 3, 2006, now abandoned.

(51) Int. Cl.
 *B60B 39/00* (2006.01)

(52) U.S. Cl. .......................................................... 291/2
(58) Field of Classification Search ............... 291/1, 2, 291/19, 20
See application file for complete search history.

(56) References Cited

U.S. PATENT DOCUMENTS

| 4,898,330 A | * | 2/1990 | Betchan | 239/135 |
| 5,104,068 A | * | 4/1992 | Krilla et al. | 244/134 R |
| 5,190,249 A | * | 3/1993 | Whitmire et al. | 244/134 R |

\* cited by examiner

*Primary Examiner* — R. J. McCarry, Jr.
(74) *Attorney, Agent, or Firm* — Charles E. Baxley

(57) ABSTRACT

Method and device for de-icing of trains is provided in which a glycol heated treatment medium is sprayed against the underside of units in the train such as locomotive and carriages in order to remove ice which has been built up in the base frames of the units.

20 Claims, 2 Drawing Sheets

METHOD AND DEVICE FOR DE-ICING OF TRAINS

CROSS REFERENCE TO RELATED APPLICATIONS

This application is a continuation-in-part of application Ser. No. 11/346,984 filed on Feb. 3, 2006 now abandoned.

FIELD OF THE INVENTION

The present invention relates to a method and device for de-icing of trains, wherein a medium is sprayed against the underside of the units in the train such as locomotive and carriages in order to remove ice which has been built up on the base frames of the locomotive and carriages.

BACKGROUND OF THE INVENTION

When trains are run during wintry conditions disturbances in schedule are often seen due to formation of ice around the brakes and bogies. With conventional de-icing systems there is a constant problem with trains which have to be removed from service due to ice formation.

On a standard size train it takes about 10 hours to remove the ice which requires enormous quantities of energy utilizing blowing hot air. In this conventional de-icing process moisture always remains on all parts under the train. When the train thereafter runs out in degrees below freezing point ice crystals are formed immediately under the entire train. These have a pointed and spiny form in its structure which means that the snow immediately clings to them and starts to build up the ice. This effect in combination with heated brakes and quick cooling results in the train quickly building up ice again.

OBJECTS AND SUMMARY OF THE INVENTION

The object of the invention is to provide a de-icing system in which the drawbacks of the conventional de-icing are eliminated.

This object is achieved in that the method and the device are characterized according to the following description and claims.

Additional objects and advantages of the invention will be made clear hereinafter.

The invention will in the following be described in connection with an embodiment of a device for de-icing of trains which includes a heater for heating a de-icing medium, a sprayer located near railroad tracks for spraying the underside of trains running on the railroad tracks, a collection tank for collecting the de-icing medium and recirculating pumps for recirculating the de-icing medium.

Additional objects, features and advantages will be apparent from the following detailed description when taken in conjunction with the accompanying drawings.

DETAILED DESCRIPTION OF THE INVENTION

Figure 1:
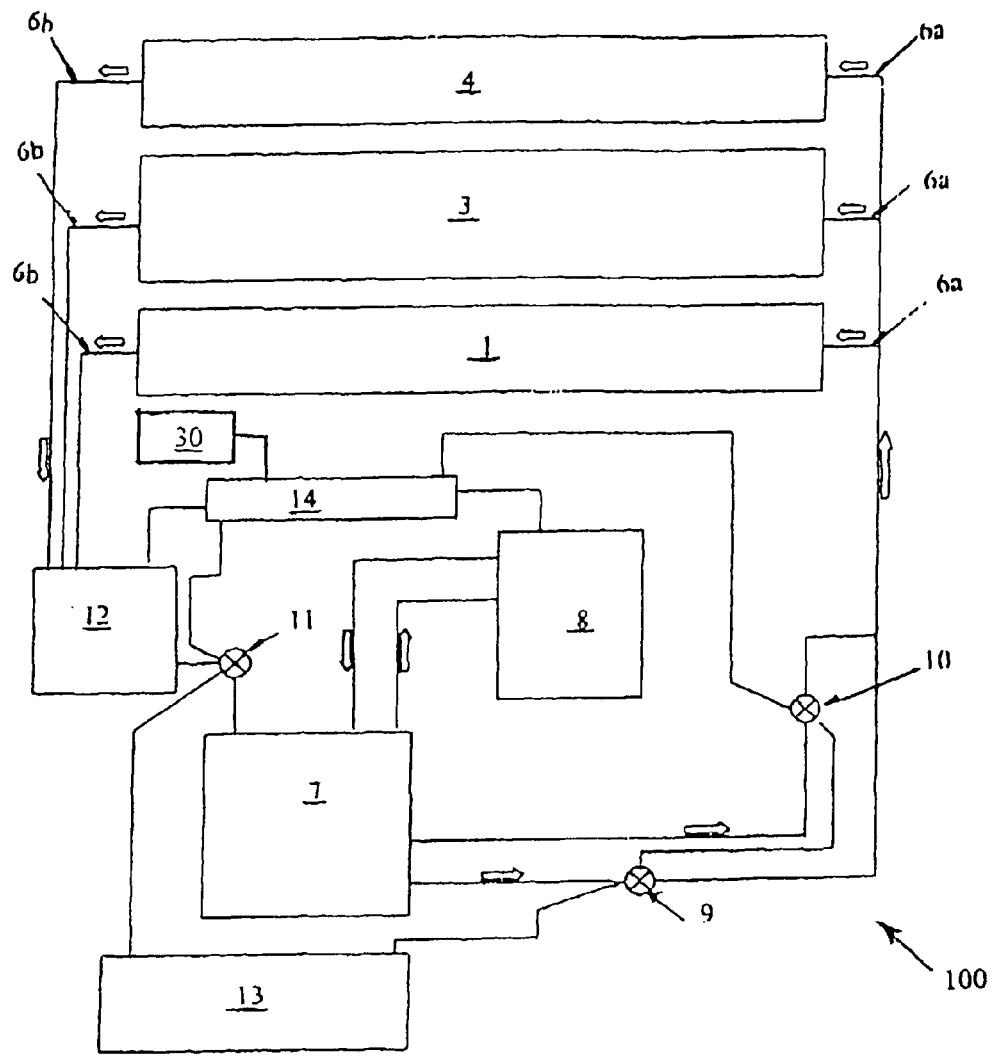
FIG. 1 is a schematic a flow chart of the device.
Figure 2:
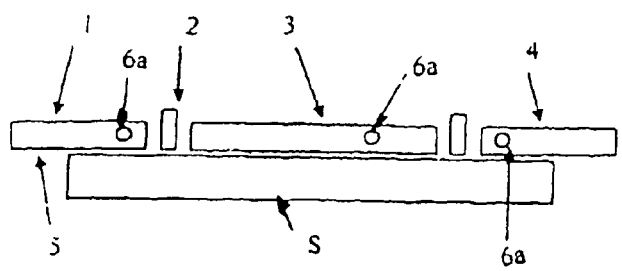
FIG. 2 is a schematic cross-section through collecting tanks in the device which is arranged on a track.

The device 100 illustrated in FIGS. 1 and 2 comprises a collecting tank 3 designed to be arranged between the rails 2 in the de-icing area of a railway track and a collecting tank 1 to the left and a collecting tank 4 to the right of the rails 2. The tanks 1, 3 and 4 each have a length of approximately 15 meters and are bolted to the sleepers S of the track by means of wood screws. The tank 3 has a width such as it lies between and with suitable space relative to the rails 2, while the tanks 1 and 4 also lie with a space relative to the rails 2 and have a width such as to extend outside of the outer side of the train carriages. At the ends of the collecting tanks 1, 3 and 4 are connections 6a, 6b for the supply and for the evacuation of a de-icing medium to and from the tanks 1, 3 and 4.

According to the invention the de-icing medium is a hot glycol which is sprayed on the under sides of the train carriages via a number of nozzles 20, 22, 24, 26 or mouthpieces arranged on the edges of the tanks 1, 3 and 4 e.g. 30 nozzles on the length of 15 meters. The glycol is stored in a tank 7 from which it is delivered to an oil an or electric pan 8 for heating to approximately 90 degrees centigrade. From the tank 7 the glycol is pumped via pumps 9, 10 to the connections 6a and nozzles 20, 22, 24, 26 of the tanks 1, 3 and 4 in a continuous flow of glycol which is ejected from the tanks 1, 3 and 4.

Figure 3:
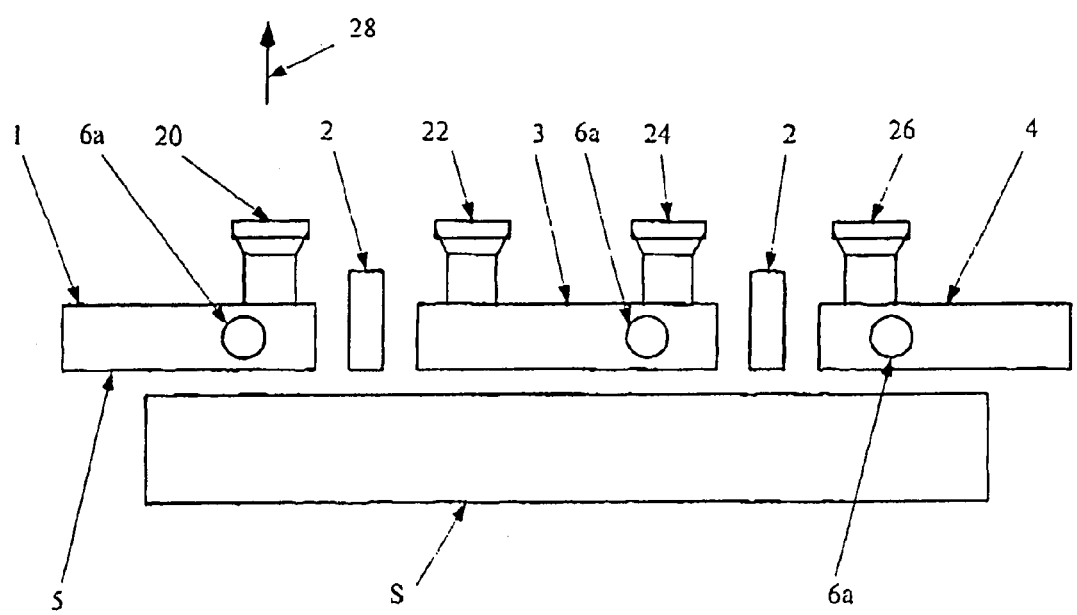
FIG. 3 is a schematic cross-section similar to FIG. 2 showing the location of the nozzles.

As shown schematically in FIG. 3, the nozzles 20, 22, 24, 26 are directed upwardly and provide a spray of glycol in the direction shown by the arrow 38 in FIG. 3. The spray from the nozzles 20, 22, 24, 26 covers the underside areas of the train which are between the rails 2 and also covers the underside areas of the train which are located outwardly relative to the rails 2.

The pressurized spray of glycol in a vertical direction against the underside of the train as indicated by the arrow 28 in FIG. 3, combines the effect of the de-icing characteristics of the glycol spray with the direct mechanical impact of the vertical fluid spray resulting in rapid and effective ice removal. The effect of the nozzles 20, 22, 24, 26 is enhanced by the location of the nozzles 20, 22, 24, 26 relatively close to the rails 2 and relative close to the undersides of the train which is directly above rails 2.

The tanks 1, 3, 4 melt the falling ice on the way towards the connections 6b of the tanks. The evacuated glycol is supplied to a recirculation system 12 which cleans it in order to be used again in the device 100 via a return pump 11 which returns the glycol to the tank 7. A power supply unit 13 is coupled to the pumps 9, 10, 11 and a control module 14 controls the function of the pan 8, the pumps 9, 10, 11 and the recirculation system 12.

The glycol used is propylenglycol which is not inflammable, poisonous or noxious to the environment. By using propylenglycol there is no formation of ice crystals under the train but instead there is a slightly remoistured and somewhat "sticky" surface on which the snow does not easily adhere and this means that ice formation beneath the train is prevented in a very efficient way. Another very big advantage of the present invention 100 is the time factor. With present de-icing plants it can today take nearly 10 hours to de-ice a train with enormous consumption of energy. In the device 100 according to the invention, the train runs in about 10 minutes above the device 100 with a speed of about 25 meters per minute and with very low consumption of energy.

If the plant or device 100 according to the present invention is used regularly in a preventive manner on trains which run in areas with much snow, it will prevent formation of ice in a very efficient way. With the device 100, according to the invention, it will thus be possible to run the trains during winter time without operation disturbances due to formation of ice around brakes and bogies. The device 100 shown may be placed anywhere along the track outdoors, it requires only support of electrical current and is for the rest entirely self-supporting and automatic.

The collecting tanks 1,3,4 are heated as described below. Under the continuing control by the control module 14, approximately once per hour, for approximately five minutes in duration, fluid is sprayed into the collecting tanks 1, 3,4 in order to heat them and melt any snow and ice collected therein. Suction pumps which are controlled by the control module 14 are started and are operated for approximately ten minutes. The operating time of the suction pumps is controlled to ensure that all of the rain, ice and snow collected by the device 100 flows into the system for treatment as described below.

When fluid is pumped into the cleaner 12 it is cleaned to a particle size of 50 microns. The fluid then flows into the storage tank 7. The fluid is heated by the heater 8 with the temperature controlled by the control module 14 and water in the fluid evaporates continuously and exits the device 100 through an exit vent or pipe (which has not been illustrated).

The power supply unit 13 is connected to the pumps 9-11 and the control module 14 controls the function of the heater pan 8, the pumps 9-11 and the recirculation system 12. The control module 14 controls various functions in the device 100. It ensures that all pumps are properly functioning. It also controls fluid flows in relation to the temperatures (it increases the fluid flow in the system if the temperature rises too high in the heater pan 8). It also closes vital functions before a problem arises. It also sends a signal to a GSM-based service system. The control module 14 also monitors the circulation system between the collecting tanks 1,3,4 and the internal circulation system in pan/heat exchanger 8.

The control module 14 also monitors all distress stops in the device 100 and is connected to a distress stop relay which provides a control function so that if a distress stop is activated, no moveable parts such as pumps 10,11 can start when the distress stop activated. Before start of moveable parts an operator must set a knob (not illustrated) to end the distress stop condition of the device 100.

The device 100 according to the present invention also includes a leakage sensor 30 which is connected to the control module 14 and which is located on the floor of the device 100 or below the device 100. In the event of a leak the control module 14 closes all valves and shuts down all pumps 9-11 and places the device 100 in a stand-by mode.

The foregoing specific embodiment of the present invention as set forth in the specification herein is for illustrative purposes only. Various deviations and modifications may be made within the spirit and scope of this invention, without departing from a main theme thereof.

The invention claimed is:

1. A method for de-icing a train having an underside portion, comprising the steps of:
   a) heating a treatment medium;
   b) spraying the treatment medium only upwardly and not downwardly against the underside portion of the train so as to form a sprayed treatment medium; and
   c) collecting the sprayed treatment medium for reuse so as to form a collected treatment medium.

2. The method as claimed in claim 1, wherein the treatment medium comprises glycol.

3. The method as claimed in claim 1, wherein said step of collecting the sprayed treatment medium is followed by the step of cleaning the collected treatment medium.

4. The method as claimed in claim 1, wherein the treatment medium comprises polypropylenglycol.

5. The method as claimed in claim 1, wherein said step of collecting the treatment medium further comprises collecting the treatment medium in a collection tank below the train.

6. The method as claimed in claim 5, wherein said step of collecting the treatment medium in a collection tank below the train further comprises collecting the treatment medium in a plurality of collecting tanks.

7. The method as claimed in claim 5, wherein said step of collecting the treatment medium in a collection tank below the train further comprises the step of evaporating water contained in the collected treatment medium.

8. The method as claimed in claim 1, wherein said step of heating a treatment medium further comprises heating the treatment medium to a temperature in an order of 90 degrees C.

9. The method as claimed in claim 1, wherein said step of collecting the sprayed treatment medium comprises collecting the sprayed treatment medium dripping from the underside portion of the train.

10. An apparatus for de-icing a train on a track, wherein the train has an underside, and wherein the track has sides, said apparatus comprising:
    a) a heater for heating a de-icing medium;
    b) a sprayer arrangement for spraying the underside of the train with the de-icing medium so as to form a sprayed de-icing medium, with said sprayer arrangement disposed proximate to the track and directed only upwardly and not downwardly;
    c) at least one collection tank for collecting the sprayed de-icing medium so as to form a collected de-icing medium, with said at least one collection tank disposed proximate to the track; and
    d) re-circulating connections connecting said at least one collection tank, said heater, and said sprayer arrangement for re-circulating the collected de-icing medium.

11. The apparatus as claimed in claim 10, wherein the de-icing medium comprises glycol.

12. The apparatus as claimed in claim 10, wherein the de-icing medium comprises polypropylenglycol.

13. The apparatus as claimed in claim 10, further comprising a plurality of collection tanks, with said plurality of collection tanks disposed proximate to the sides of the track.

14. The apparatus as claimed in claim 10, further comprising a cleaner connected to said re-circulating connections for cleaning the collected de-icing medium.

15. The apparatus as claimed in claim 10, further comprising a collection tank disposed between the sides of the track.

16. The apparatus as claimed in claim 10, further comprising a collection tank disposed along side and disposed outwardly relative to the track.

17. A method for de-icing a train having an underside portion, comprising the steps of:
    a) heating a treatment medium;
    b) spraying the treatment medium against the underside portion of the train so as to form a sprayed treatment medium, with the sprayed treatment medium directed only in an upward direction and not in a downward direction;
    c) collecting the sprayed treatment medium so as form a collected treatment medium; and
    d) re-circulating the collected treatment medium for reuse.

18. The method as claimed in claim 17, wherein the treatment medium comprises glycol.

19. An apparatus for de-icing a train on a track, wherein the train has an underside, said apparatus comprising:
    a) a heater for heating a de-icing medium;

b) a sprayer arrangement for spraying the underside of the train with the de-icing medium so as to form a sprayed de-icing medium, with said sprayer arrangement disposed proximate to the track, and with said sprayer arrangement disposed only upwardly and not downwardly to direct a spray only in an upward direction and not in a downward direction;

c) at least one collection tank for collecting the sprayed de-icing medium so as to form a collected de-icing medium, with said at least one collection tank disposed proximate to the track; and d) re-circulating connections connecting said at least one collection tank, said heater, and said sprayer arrangement for re-circulating the collected de-icing medium.

20. The apparatus as claimed in claim 19, further comprises:

e) a control unit connected to said heater and said re-circulating connections; and f) a leakage sensor connected to said control unit.

* * * * *